(12) United States Patent
Spiker

(10) Patent No.: US 11,893,758 B2
(45) Date of Patent: Feb. 6, 2024

(54) AUTOMATED COLOR CALIBRATION SYSTEM FOR OPTICAL DEVICES

(71) Applicant: Nicholas Robert Spiker, Port Orchard, WA (US)

(72) Inventor: Nicholas Robert Spiker, Port Orchard, WA (US)

(73) Assignee: Verichrome, Port Orchard, WA (US)

( * ) Notice: Subject to any disclaimer, the term of this patent is extended or adjusted under 35 U.S.C. 154(b) by 166 days.

(21) Appl. No.: 17/581,976

(22) Filed: Jan. 23, 2022

(65) Prior Publication Data

US 2023/0237686 A1    Jul. 27, 2023

(51) Int. Cl.
| | | |
|---|---|---|
| G06T 7/70 | (2017.01) | |
| G06T 7/90 | (2017.01) | |
| H04N 17/00 | (2006.01) | |
| G01J 3/52 | (2006.01) | |
| H04N 7/00 | (2011.01) | |

(52) U.S. Cl.
CPC ............... G06T 7/70 (2017.01); G01J 3/524 (2013.01); G06T 7/90 (2017.01); H04N 7/002 (2013.01); G06T 2207/10024 (2013.01)

(58) Field of Classification Search
CPC ... G06T 7/70; G06T 7/90; G06T 2207/10024; G01J 3/524; G01J 3/52; H04N 17/002
See application file for complete search history.

(56) References Cited

U.S. PATENT DOCUMENTS

| | | | | |
|---|---|---|---|---|
| 2020/0370952 A1* | 11/2020 | Borra | ............ | G01J 1/14 |
| 2021/0199479 A1* | 7/2021 | Lau | ............ | G01D 18/008 |
| 2021/0303898 A1* | 9/2021 | Wang | ............ | G06V 20/10 |
| 2021/0316669 A1* | 10/2021 | Wang | ............ | G01S 7/4086 |
| 2022/0284627 A1* | 9/2022 | Johnson | ............ | B60W 30/143 |

FOREIGN PATENT DOCUMENTS

| | | |
|---|---|---|
| CN | 115439509 A * | 12/2022 |
| WO | WO-2021036267 A1 * | 3/2021 |

OTHER PUBLICATIONS

Cosentino, A. "Identification of pigments by multispectral imaging; a flowchart method"; Heritage Science 2014, Chemistry Central, pp. 1-12 (Year: 2014).*
Zhang, P. "Pigmented Structural Color Actuators Fueled by Near-Infrared Light" ACS Appl. Mater. Interfaces 2022, 14, 20093-20100 (Year: 2022), pp. 1-8.*

\* cited by examiner

*Primary Examiner* — Mia M Thomas
(74) *Attorney, Agent, or Firm* — John Alimut; Kal K Lambert

(57) ABSTRACT

A color calibration system for color correction in an optical device using a database of target colors includes a physical target card. The physical target card includes at least three unique colored patches arranged in a predetermined pattern on the physical target card, identifying indicia, and alignment indicia. The color calibration system also includes an executable machine-readable software. The software is configured to read and assign a value to the colored patches. The software is further configured to read the identifying indicia and identify the physical target card, and to read the alignment indicia for identifying individual colored patches. The software is further configured to compare color values in the optical device to known factory color values, generate a target card profile, and convert native color space for use in subsequent images under the same lighting conditions.

20 Claims, 10 Drawing Sheets
(8 of 10 Drawing Sheet(s) Filed in Color)

AUTOMATED COLOR CALIBRATION SYSTEM FOR OPTICAL DEVICES

BACKGROUND

Field of the Disclosure

The present disclosure generally relates to color management. More specifically, the present disclosure relates to color calibration systems for optical devices.

Related Art

Color management and calibration are integral processes for managing color display across a wide range of implementations. Virtually all consumer products either have a color, or rely on some sort of color management, for example, plastic parts for reference, swatch cards, or even digitally defined color numbers. In one entertainment industry example, films are typically produced with multiple cameras, and colors in different shots must appear the same for continuity purposes. In other examples, products such as televisions need to display color uniformly across devices. In an exemplary instance of these examples, an outdoor image displaying grass should be displayed as the same shade of green regardless of the display model a user purchases or other variables.

Currently, color management systems for displaying colors rely on a digital color standard first established in 1931 by the Commission Internationale de l'éclairage (International Commission on Illumination), known as the CIE 1931 standard. Numerous automated systems have been developed to calibrate these devices to the CIE 1931 standard. Some systems used currently rely on a manual measurement and capture process. This process is either accomplished using a calibrator that includes a spectrometer and a software package programmed to generate a profile, or by using known values that are "close" to the target in hand. Additionally, the display device may be manually measured using a spectrometer.

In the case of cameras, this process involves taking a photograph of a known target color (as discussed above, by manually measuring color patches and comparing them to the photograph in order to determine what the CIE 1931 standard colors are for the target image in question). This profile is then applied to subsequent images captured with the optical device under the same lighting conditions. The images in the set now have a profile, known as a "scene reference profile." Any changes in lighting will likely invalidate the profile. Therefore, current systems in the art do not exist to provide an end-to-end automated system for calibrating optical devices.

Therefore, what is needed is a color calibration system that provides an end-to-end automated system for calibrating optical devices without the limitations of existing techniques.

SUMMARY

A smart color calibration system for use with an image, image software, and a pigment database includes a physical smart target card having a series of pigment patches. The pigment patches include the brightest spectral neutral possible and the darkest possible for generating a vignette correction map. The pigment patches also include at least one fifty percent reflectance patch and at least one fifty percent lab space patch (i.e., 18% reflectance). The pigment patches preferably also include at least one patch having a fluorescent indicator, at least one patch sensitive to infrared contamination and at least one patch sensitive to degrading effects that may damage other pigment patches. The pigment patches are configured to be read by the software in order to perform functions on data from the image, thereby calibrating the color of the image.

The physical smart target comprises a rigid black material with paint adhesion properties. To achieve paint adhesion, the physical smart target may include a sanded, roughened surface, and an adhesion promoter. In one implementation, the pigment patches are arranged in a grid pattern. The physical smart target may also include at least one pigment patch sensitive to degrading effects is sensitive to at least UV light, chemicals, or temperature. To further protect the physical smart target, it may also include a protective clear coat. For accurate viewing in different light angles, the physical smart target may have a non-reflective matte finish.

Preferably, the physical smart target further includes indicia identifying the specific smart target to the software. In various implementations, the identifying indicia may be a computer readable code, such as a barcode or QR code. The physical smart target may also include pigment patches configured to reveal metamerismic lighting conditions, filters, etc. In addition to the pigment patches, the physical smart target preferably includes fine alignment marks. The fine alignment marks are preferably arranged in a white-red-green-blue diamond pattern and may be positioned between the pigment patches to aid in orientation discovery and distortion correction. The physical smart target also preferably includes bullseye indicia for rough detection and alignment with the image. In one implementation, the bullseye indicia are placed at the four corners of the physical smart target.

The software is configured to read the image from a digital negative of an image producing device and perform a Fast Fourier Transform (FFT) on data from the image, to produce a spiral having the same geometric frequency as the bullseye indicia and padded to match the dimensions of the image. The FFT is applied to the spiral, and the image FFT is divided by the spiral FFT, with FFT applied to the resulting output. Thus, the software is configured to establish areas where the bullseye indica are located on the image. The software is also preferably configured to filter noise and dot size to produce visible spots used for initial crop and transformation of the image.

The software is also preferably configured to identify fine alignment markings to produce a distortion map, to read indicia identifying the specific smart target to create a specific profile, and to store data of the specific profile in an encrypted manner, thereby enabling the calibration to be reused.

In one alternative implementation, the smart color calibration system may simply comprise a physical smart target, which is a color target with three or more unique colored patches arranged in such a way that they can be read out easily by accompanying image software. On the face of the smart target, a software-readable optical identification marking is provided along with the color targets, enabling the software to identify and differentiate one specific physical smart target from others. A digital database is prepared of the colors on a specific smart target, and the software either contains or is in communication with the digital database of the colors. The database of colors on a specific smart target are scanned when the smart target is manufactured, and a profile of the specific colors is created. The profile may be used at a later point under virtually any lighting conditions.

An alignment function is also associated with or provided in the software, such that the captured image of a specific smart target can be recognized, including values for each colored patch. Values of each individual colored patch are read by the software. The software is configured to compare the optical values of a particular smart target to known factory color values and generate a profile to convert from a device-native color space under existing lighting conditions, for use on subsequent images under the same conditions.

In various implementations, a code, such as Aztec code may be used for optical identification marking, since Aztec codes are compact, reliable, and in the public domain. Additionally, lightfast and physically durable pigments may be used when manufacturing the physical smart target, thus ensuring a longer smart target lifespan, including under extreme conditions. Preferably, spectral neutral white and black patches, in some instances similar in size to the color patches, are arranged in the center and at the corners of the smart target for software vignette correction.

In other implementations, a fifty percent reflectance patch may be included on the smart target for performing a simple white balance using existing methods. The smart target may also include a LAB 50 (18% reflectance) patch for establishing an exposure value readout using existing methods. The smart target may also include a fluorescent indicator for determining the amount of UV light in a scene, which is readable via the software. The smart target may also include an infrared indicator for determining the level of infrared contamination, which is readable via the software.

In additional implementations, a fugitive indicator patch may be included. A fugitive indicator patch changes color when exposed to excessive UV light, chemicals, and/or temperatures, in order to provide an indication of the current degradation state of the other patches on the smart target and allows the software to calculate a color shift in the other color patches for additional color accuracy over the target lifetime. The fugitive indictor is readable via the software. Additionally, a protective matte clear coat to increase target lifetime and provide a more uniform reading at different light angles.

In yet other implementations split pigment patches may be used to provide a user of the smart color calibration system a quick human eye visual indication of the current lighting conditions without the need for any electronic equipment and to identify any metamerismic lighting conditions. Split pigment patches also allow a user to quickly assess the level of deviation from the standard observer color model (known as a Luther-Ives condition) by viewing the split patches in the captured image and comparing to how the split patches appear with the naked eye.

In the above descriptions bullseyes for alignment were chosen to enable a quick and robust first alignment step, i.e., a fast Fourier transform (FFT) step. Also, in the above descriptions, and as illustrated, fine alignment Red, Green, Blue, and White markings are provided to correct for geometric distortions, so that the patch values can be read out accurately (for example with a fisheye lens). In the above software descriptions, an encrypted transfer of color values is provided from the database to an end user optical device, thus allowing for individual device licensing. In the above implementations, pigment spectral curves are preferably weighted by color according to visual importance and for difficult visual spectral areas to increase the profile accuracy. The smart targets are constructed of a durable material to extend the life of the target beyond traditional color target lifetimes also allowing for the use in extreme environments, including such as underwater filming.

BRIEF DESCRIPTION OF THE FIGURES

The patent or application file contains at least one drawing executed in color. Copies of this patent or patent application publication with color drawing(s) will be provided by the Office upon request and payment of the necessary fee.

Figure 1:
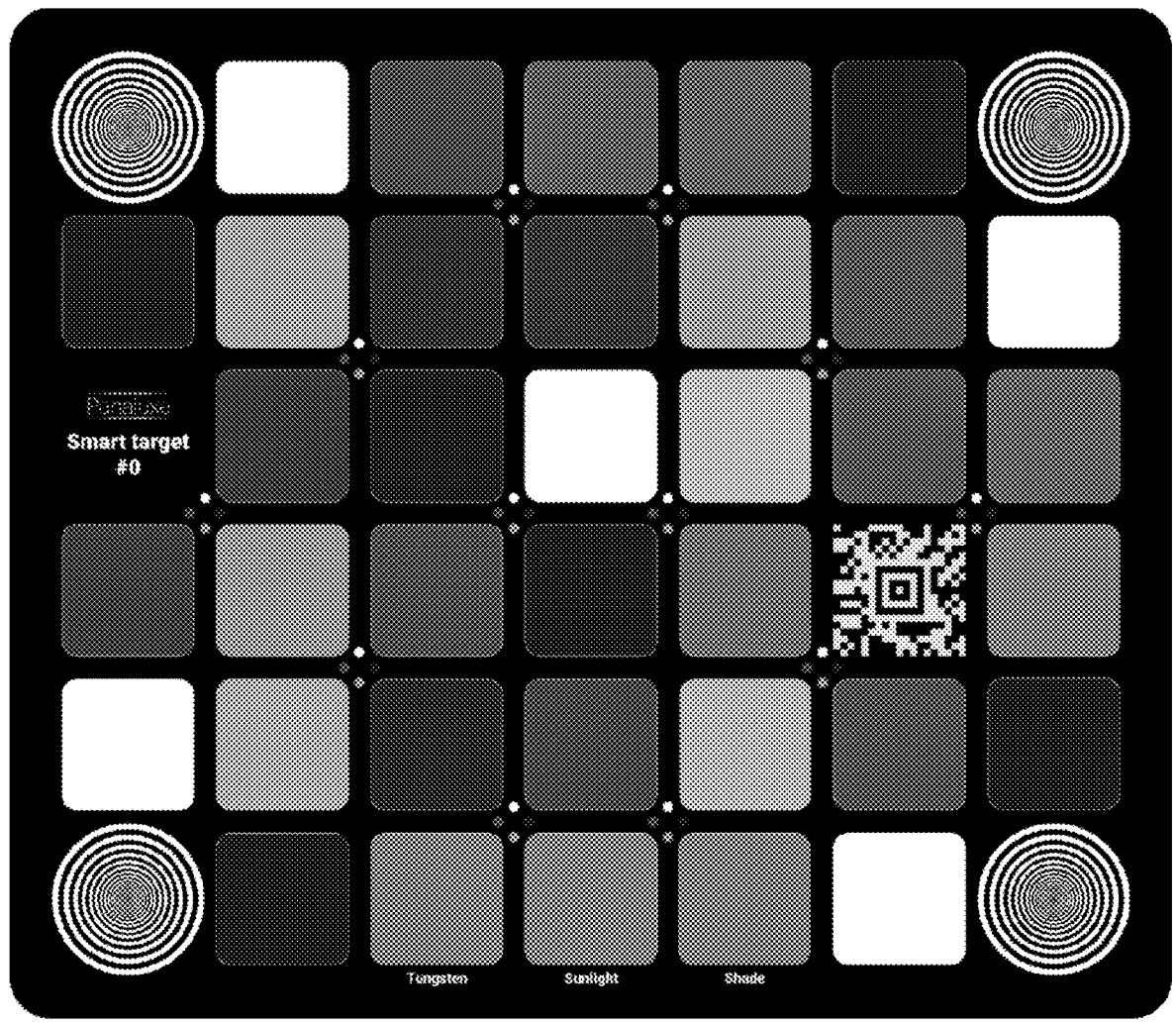
FIG. 1 illustrates a physical smart target having a plurality of pigment patches in accordance with the current disclosure.

REFERENCE NUMBERS 10. smart target
12. pigment patches
14. identification patch
16. logo patch
18. title patch
20. serial number patch
22. QR code
24. fine alignment marking circles
26. bullseye corners
28. image from an optical device
30. spiral image
32. visible spots
34. fine alignment markings

DESCRIPTION

The following description is presented to enable any person skilled in the art to make and use the disclosure and is provided in the context of a particular application and its requirements. Various modifications to the disclosed implementations will be readily apparent to those skilled in the art, and the general principles defined herein may be applied to other implementations and applications without departing from the spirit and scope of the present disclosure. Thus, the present disclosure is not limited to the implementations shown but is to be accorded the widest scope consistent with the principles and features disclosed herein.

In one implementation, a color calibration system comprises a durable physical smart target 10. The smart target 10 includes colored pigment patches 12. A pigment database and a software package are included for use on an electronic device for detecting color. Preferably, the pigment patches 12 have a high lightfastness, and are durable. They are also preferably weighted by color according to visual importance and for difficult visual spectral areas. Each target pigment patch 12 is individually scanned by a spectrometer (not shown) before being delivered to an end user and each spectral data measurement is kept on a reliable online database for end user access and profile generation by the end user device.

Each physical smart target 10 pigment patch 12 is designed in such a way that the target (i.e., the pigment patch 12) is trackable for the lifespan of the target and by serial number, in order to produce accurate color at the end user device (not shown) throughout the lifecycle of the target pigment patch 12. This allows an end user to point a camera (not shown) at a target pigment patch 12 and instantly generate a scene reference profile. Once the scene reference profile has been generated, an optical device (not shown) can accurately read colors and can be used to produce accurate color images. As an added side benefit, the calibrated optical device is now capable of matching paint colors and calibrating displays.

Figure 2:
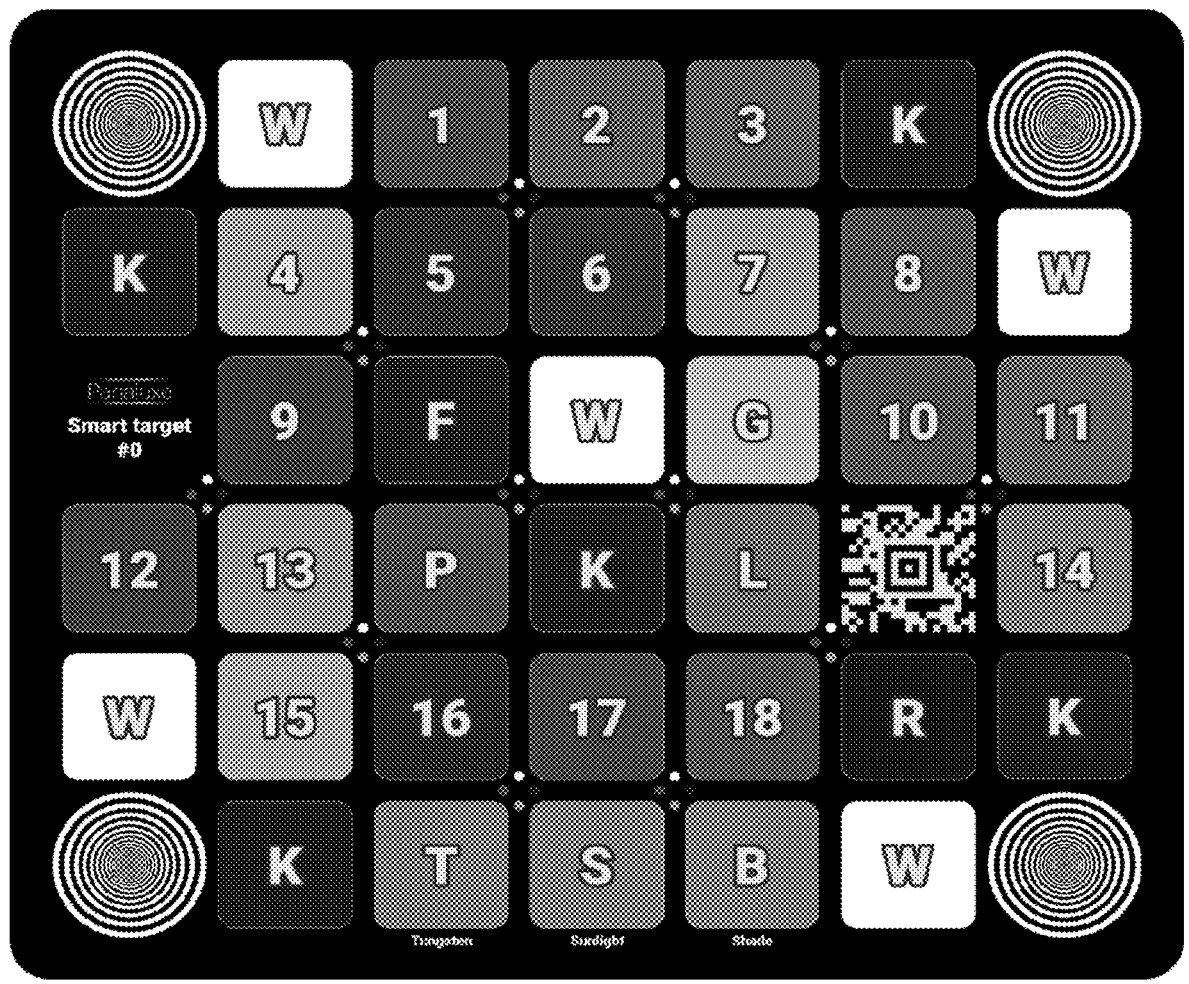
FIG. 2 illustrates the physical smart target, wherein the pigment patches are identified according to their individual properties.

Referring to FIG. 2, the smart target 10 is preferably constructed from a rigid durable black material having effective paint adhesion properties. The dimensions of the smart target 10 can be scaled to any size preferable to a user. The rigid durable black material surface is preferably initially prepared by sanding it with a fine abrasive then applying an adhesive promoter for colorants. The base colorants are applied for all numbered pigment patches 12 (FIG. 1) in a grid fashion. Base colorants are preferably chosen for high lightfastness and physical durability.

FIG. 2 illustrates lettered pigment patches 12 on the smart target 10. The lettered pigment patches 12 each have a specific function. Pigment patches W and pigment patches K are used to generate a vignette correction map. Pigment patches W are all identical and all comprise the brightest spectral neutral possible, given colorant constraints. Pigment patches K are also all identical and are as dark as possible given colorant constraints. Pigment patch G and pigment patch L are each a spectral neutral grey. Pigment patch G and pigment patch L differ in that pigment patch G is fifty percent reflectance, while pigment patch L is fifty percent lab space (i.e., 18% reflectance).

Pigment patch F is a fluorescent indicator pigment patch which is used to display to an end user roughly the amount of UV present in an image. Pigment patch R is used to measure the level of infrared (IR) contamination in an optical device. Pigment patch P comprises a fugitive pigment, selected to indicate any physical damage to the smart target 10 from ultraviolet (UV) light, harsh chemical exposure or excess temperature that may degrade the other pigment patches (e.g., G, L, F, and/or R, etc.).

Once the smart target 10 is coated with the appropriate colorants in the pigment patches (e.g., G, L, F, and/or R, etc.), a clear coat material (not shown) is applied for protection and to provide a uniform pigment patch surface finish. Preferably, the clear coat material is either chemically or mechanically etched to provide a matte finish. The smart target 10 (and pigment patch 12) matte finish is designed so that the smart target 10 provides consistent color regardless of viewing angle. The smart target 10 matte finish also eliminates any mirror-like reflection that might interfere with color consistency.

The smart target includes a human-readable identification (ID) patch 14 that may comprise one or more of the logo 16, title 18, and serial number 20 of the smart target 10. The smart target 10 also preferably includes a quick response (QR) code 22. It is anticipated that in various implementations, a barcode or other type code capable of identifying information may be used in place of the QR code 22. The QR code 22 is used to provide the software associated with the smart target 10 with the ID number of the smart target 10. For security, the QR code 22 may also include a unique challenge message to confirm the identity of the smart target 10.

Pigment patches T, S, and B are used to provide a visual indication to a standard observer to check for metamerismic lighting conditions, filters, etc. If a standard observer looks at each patch under each respective light source (in the illustrated implementation; tungsten, sunlight, and shade) the left portion and the right portion of the pigment patch will visually match. There are fine alignment marking circles 24 arranged in a white-red-green-blue diamond to aid in orientation discovery and distortion correction between the pigment patches 12 (FIG. 1). The locations and location pattern of the fine alignment marking circles 24 are selected for reliable detection and distortion correction.

The smart target 10 also includes bullseye corners 26. The bullseye corners 26 are used to perform rough detection and alignment. The "bullseye" patterns of the bullseye corners 26 were chosen because they can be quickly and reliably detected at any scale and in any orientation. This eliminates the need for a user customer to align the smart target 10 in any particular way. Importantly, the pigment patch 12 types, order, and placement of markings is not specific to the illustrated implementation, and may be determined by the smart target type, which is readable by scanning the QR code 22. This allows the smart target 10 to be made in multiple configurations, patch counts, and with added features to be determined in the future.

Figure 3:
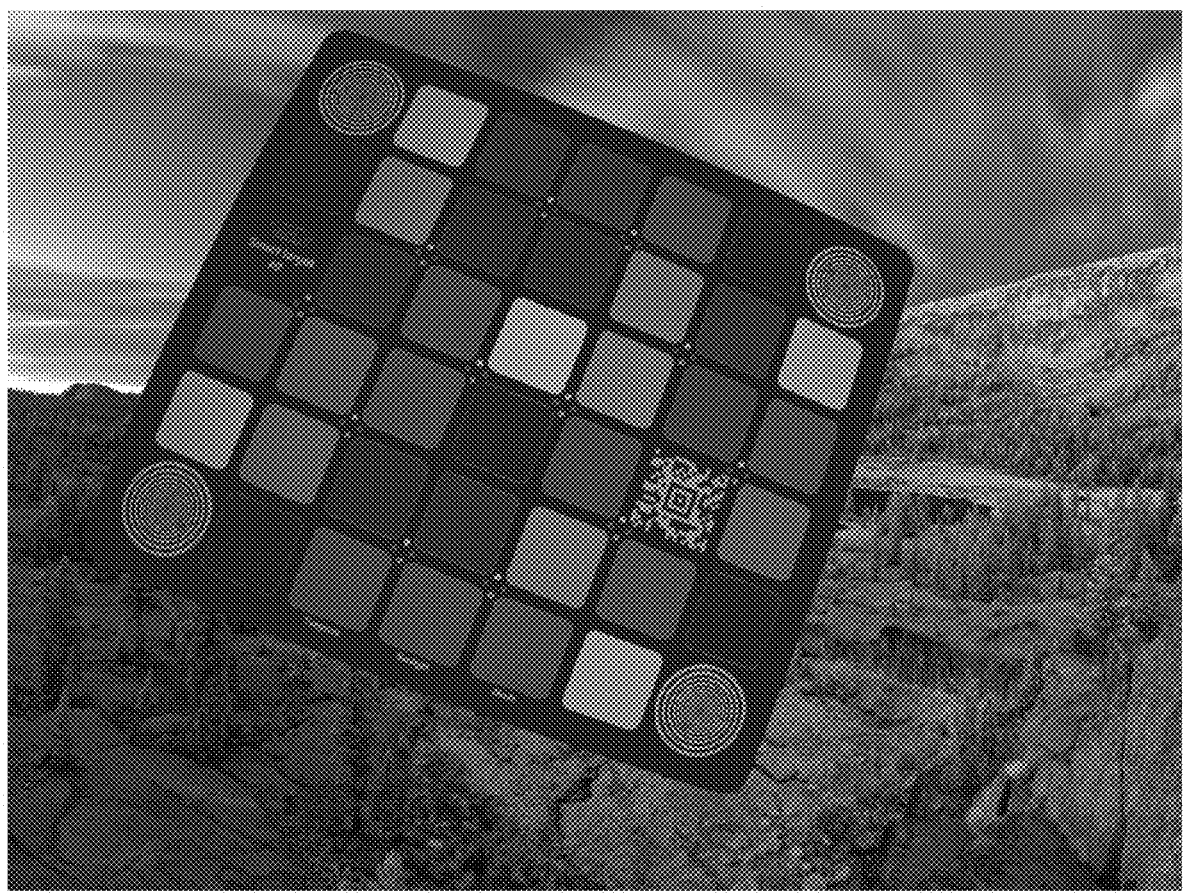
FIG. 3 illustrates an image of the physical smart target in use with the software and an image to be calibrated.
Figure 4:
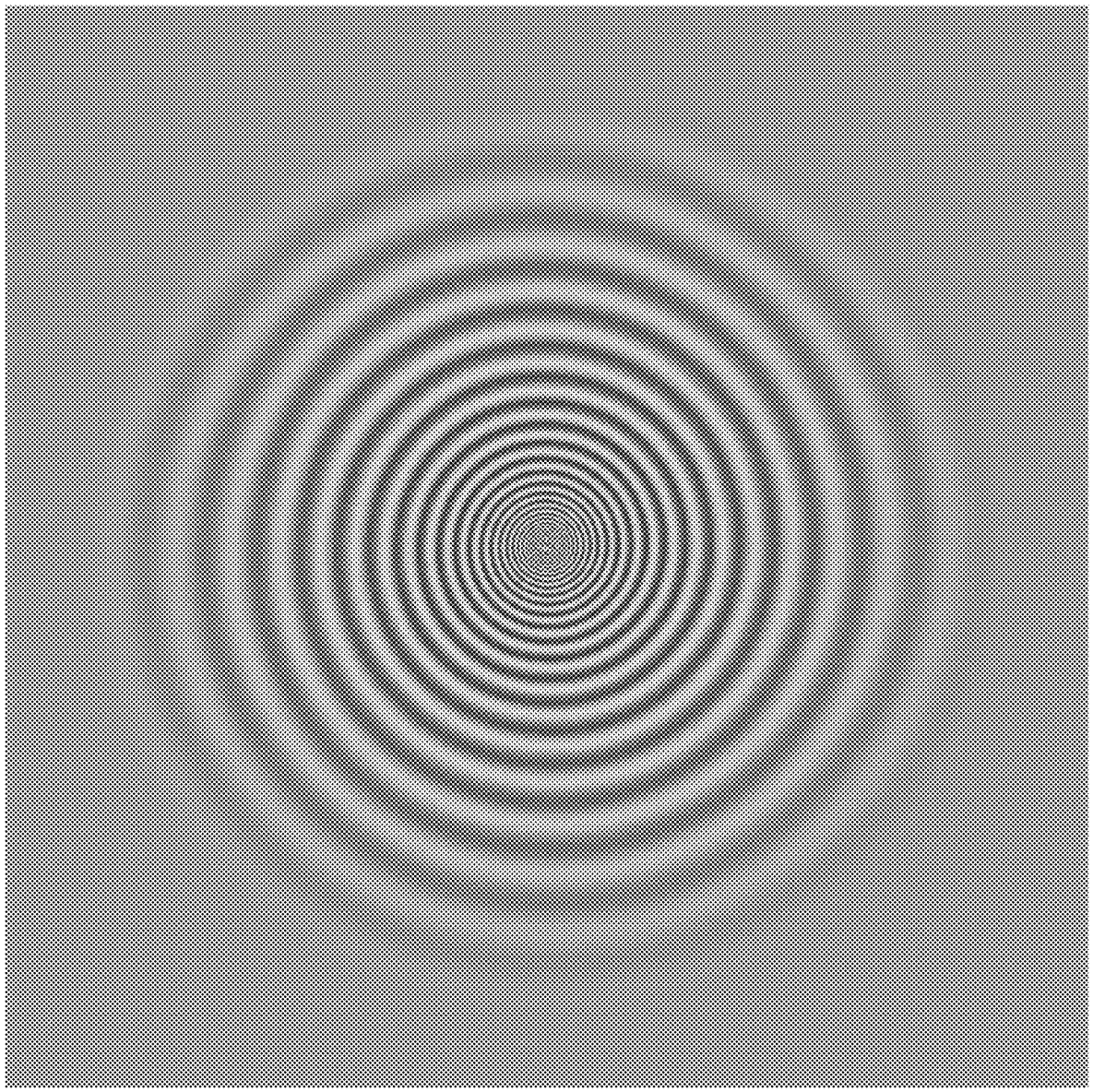
FIG. 4 illustrates a spiral image created with the physical smart target and the image of FIG. 3.

Referring to FIG. 3, the smart target 10 of the present disclosure is shown in use with the software of the present disclosure. As shown in FIG. 3, an image 28 from an optical device (not shown) is read from a digital negative (DNG) viewer. A Fast Fourier Transform (FFT) of the image data is then created. Referring to FIG. 4, a spiral image 30 is then created with real and imaginary parts to match the same geometric frequency as the bullseye corners 26 of the smart target 10. The spiral image 30 is padded to match the captured image 28 (FIG. 3) dimensions. The spiral image 30 is then FFT'd. The image 28 FFT is divided by the spiral image 30 FFT and the resulting output is FFT'd. Dividing the image 28 FFT by the spiral image 30 FFT returns bright areas where the bullseye corners 26 of the smart target 10 are located on the image 28.

Figure 5:
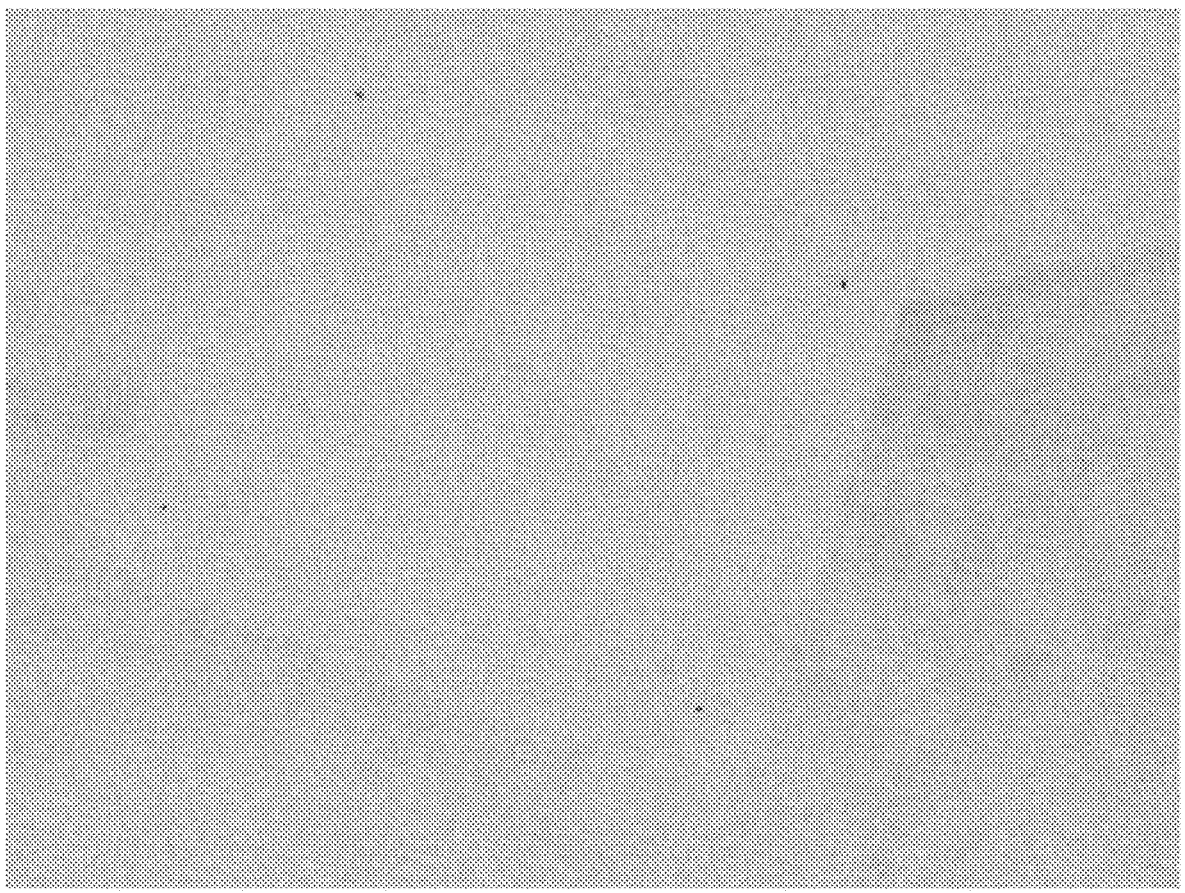
FIG. 5 illustrates 4 visible spots generated on a Fast Fourier Transform (FFT) map used for initial crop and transformation of the image of FIG. 3.
Figure 6:
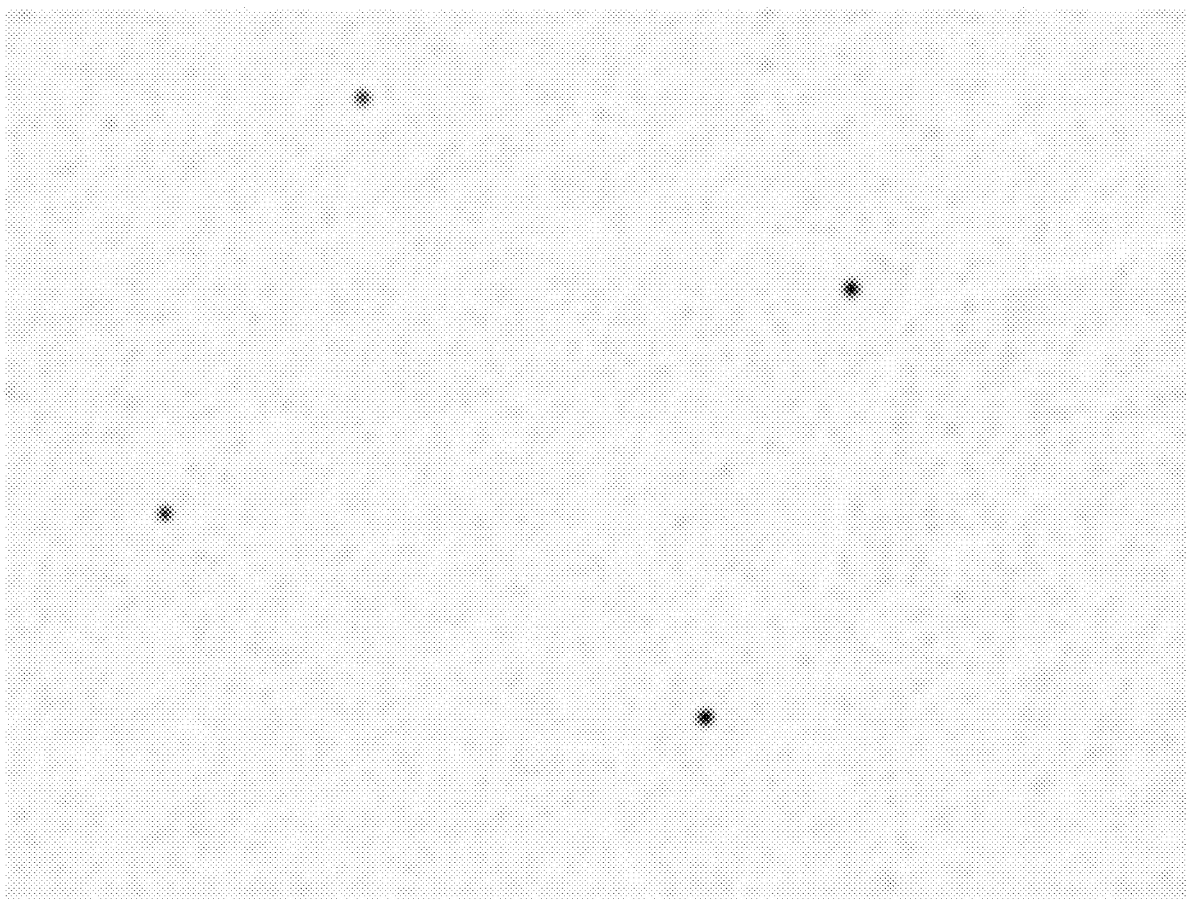
FIG. 6 illustrates the four visible spots of FIG. 5 with an initial transformation applied.

Referring to FIG. 5, the resulting FFT map is filtered for noise and dot size to produce 4 visible spots 32 used for an initial crop and transformation of the image 28. Referring to FIG. 6, the four visible spots 32 are shown with the initial transformation applied. Orientation is not considered until fine alignment is applied.

Figure 7:
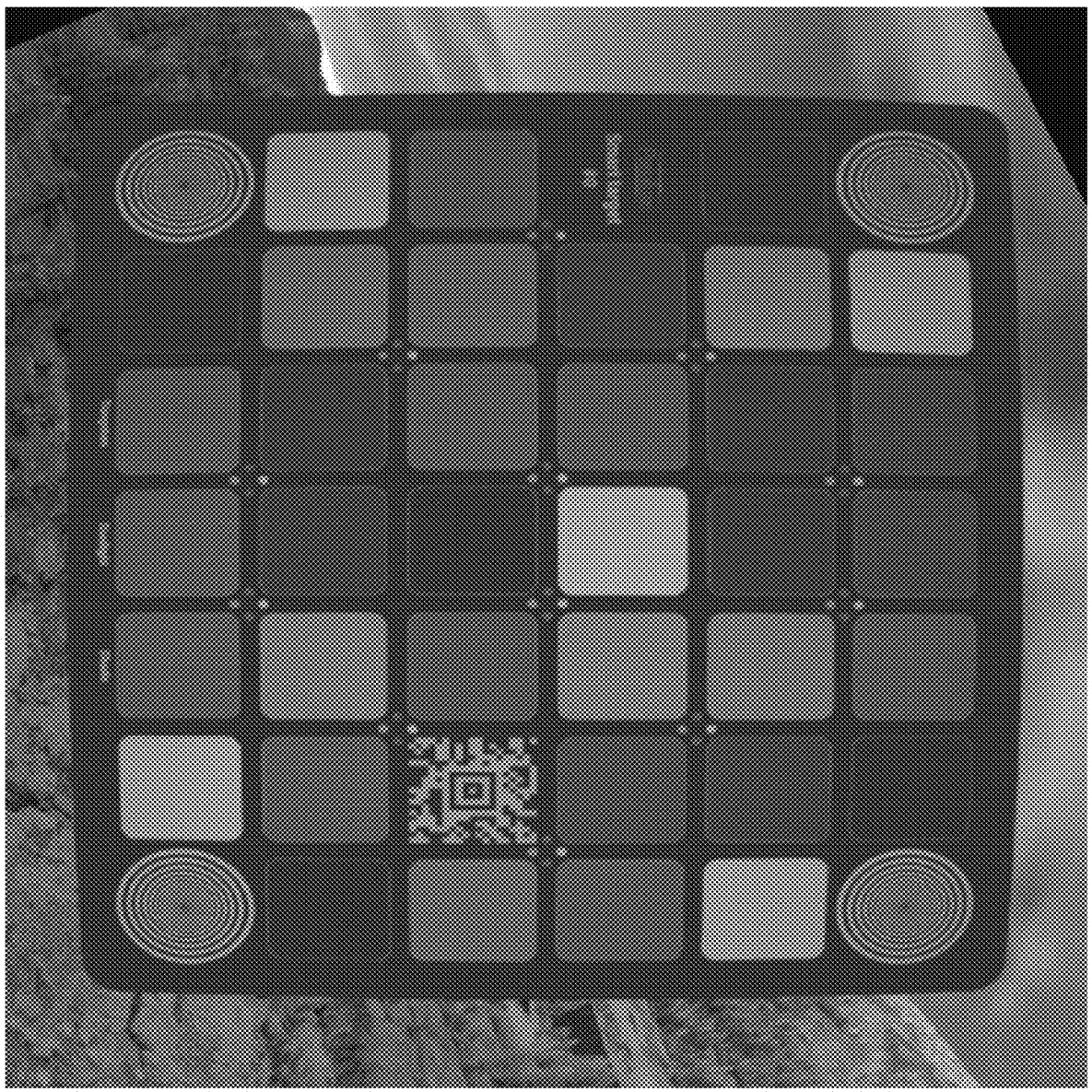
FIG. 7 illustrates a distortion map created using pixel shifts and channel mixing of the pigment patches of the physical smart target.
Figure 8:
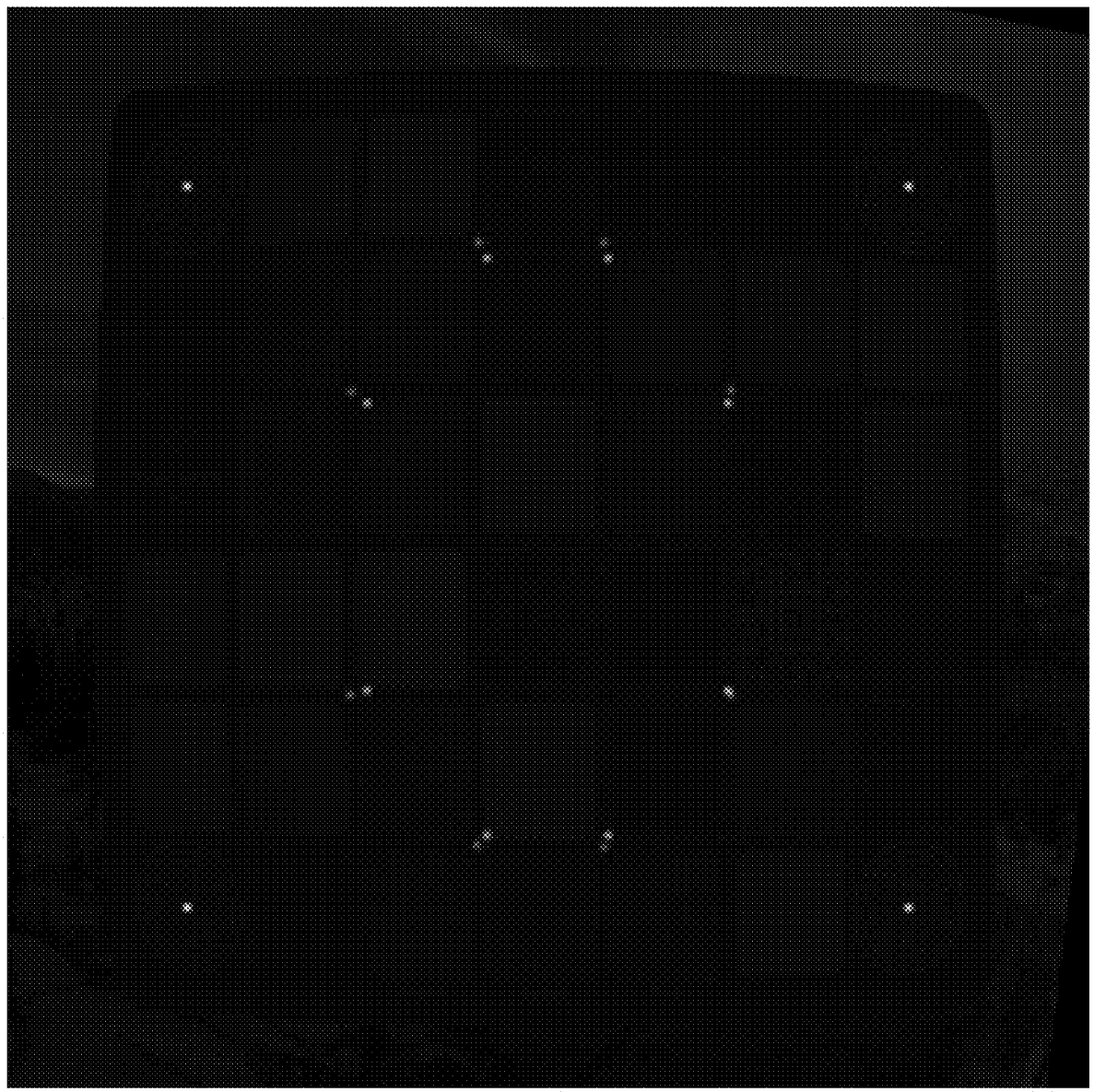
FIG. 8 illustrates a distortion polynomial which is found for the best fit, applied to the image data of the image of FIG. 3.

Referring to FIG. 7, fine alignment markings 34 are discovered on the smart target 10 using pixel shifts and channel mixing to produce a resulting distortion map. The highest correlation is used to determine orientation of the smart target 10. Bullseye corner 26 locations are also refined by finding the darkest point in each of the bullseye corner 26 centers. Referring to FIG. 8, a distortion polynomial is found for the best fit and is applied to the image data.

Figure 9:
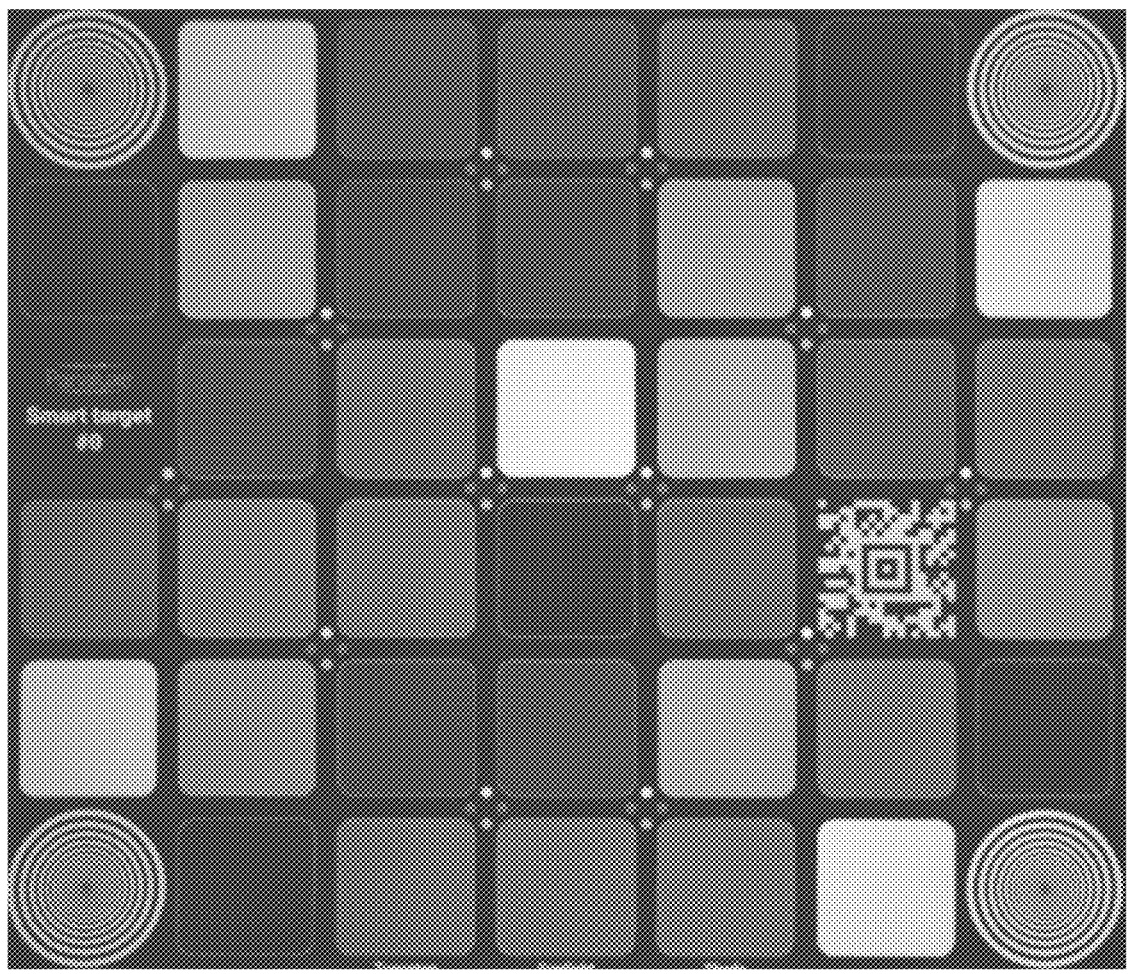
FIG. 9 illustrates the physical smart target, including a QR code patch for reading by software associated with the physical smart target.
Figure 10:
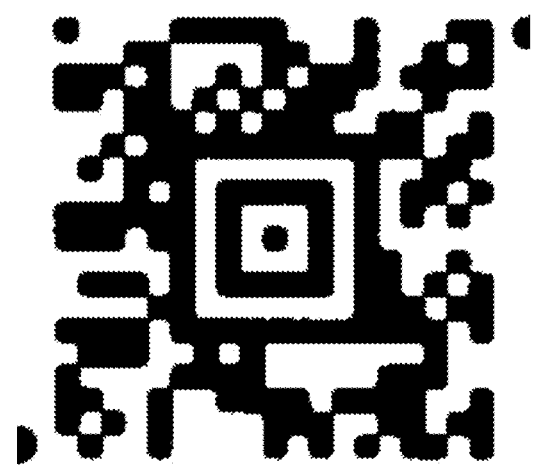
FIG. 10 illustrates an exemplary QR code patch, including exemplary QR code parameters.

Referring to FIG. 9, the barcode patch is cropped, and a threshold is applied to the barcode image. This image is then fed to the barcode reader. FIG. 10 shows an exemplary QR code having the following exemplary data. The data the barcode reader returns is compared for validation and used for identification. In the QR code of FIG. 10 the data includes:

"Panaluxe!RyAPrw0uJKdK 0"
Check data=Panaluxe
Target type=!
Unique ID=RyAPrw0uJKdK
Serial number=0

Figure 11:
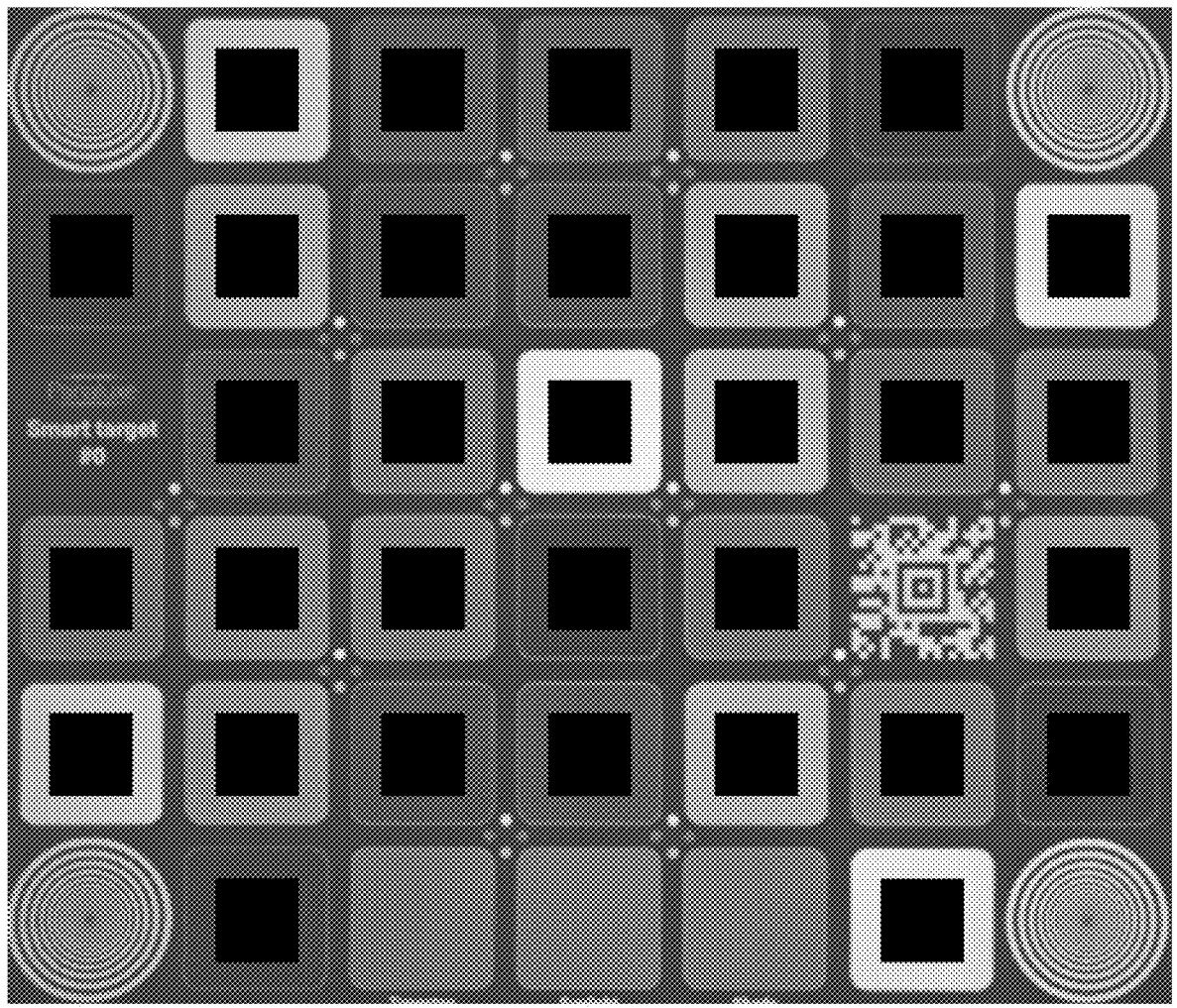
FIG. 11 illustrates the patch values of the physical smart target read out by averaging center portions as defined by the target type.

Referring to FIG. 11, the patch values are then read out by averaging center portions as defined by the target type. The white and black patches (i.e., pigment patches "W" and pigment patches "K") are used to generate a vignette profile. The patch data is black point corrected and flat field corrected based on the vignette profile. The resulting data is stored for profile generation after the spectral data is retrieved from the server. Thereafter, the client software sends the target serial number and unique ID to the server (not shown). The data is preferably encrypted by the client device private key. The data is preferably decrypted on the server side and the serial number and unique ID is checked against a database. If there is a match, the file with factory spectral data and pre-calculated color values is sent to the user device using the same end to end encryption. The factory spectral data and pre-computed color data is available for use on that device as many times as needed or until the user removes the factory data. Preferably data stored on any client device is encrypted. A three-by-three transformation matrix is calculated using a best fit solution and is preferably returned to the user in the form of a tag on the input digital negative (DNG).

Referring to the above description, in a basic implementation, the smart color calibration system is for color correction in an optical device using a database of target colors and includes a physical target card. The physical target card includes at least three unique colored patches arranged in a predetermined pattern on the physical target card. The physical target card also includes identifying indicia and an alignment indicia. An executable machine-readable software is configured to read and assign a value to the colored patches. The software is also configured to read the identifying indicia and identify the physical target card and to read the alignment indicia for identifying individual colored patches. The software is further configured to compare color values in the optical device to known factory color values, to generate a profile assigned to the physical target card, and to convert native color space detected by the device under a specific lighting condition for use in subsequent images under the same lighting conditions.

The foregoing descriptions of implementations of the present disclosure have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present implementation. The scope of the present disclosure is defined by the appended claims.

What is claimed is:

1. A color calibration system for color correction in an optical device using a database of target colors, the smart color calibration system comprising:

a physical target card;
the physical target card comprising at least three unique colored patches arranged in a predetermined pattern on the physical target card;
the physical target card further comprising identifying indicia;
the physical target card further comprising an alignment indicia; and
an executable machine readable software;
the software configured to read and assign a value to the colored patches;
the software configured to read the identifying indicia and identify the physical target card;
the software configured to read the alignment indicia for identifying individual colored patches;
wherein the software is further configured to compare color values in the optical device to known factory color values, to generate a profile assigned to the physical target card, and to convert native color space detected by the device under a specific lighting condition for use in subsequent images under the same lighting conditions.

2. The color calibration system of claim 1 wherein the identifying indicia comprises an Aztec code for optical identification marking.

3. The color calibration system of claim 1 wherein the colored patches are lightfast.

4. The color calibration system of claim 1 further comprising spectral neutral white and black patches for software vignette correction.

5. The color calibration system of claim 4 wherein the spectral neutral white and black patches are arranged in a center and at corners of the physical target card.

6. The color calibration system of claim 1 further comprising a fifty percent (50%) reflectance patch for performing a white balance.

7. The color calibration system of claim 1 further comprising an eighteen percent (18%) reflectance LAB 50 patch for performing an exposure value readout.

8. The color calibration system of claim 1 wherein the physical target card further comprises a fluorescent indicator.

9. The color calibration system of claim 8 wherein the software is configured to determine an amount of ultraviolet (UV) light in a scene using the fluorescent indicator.

10. The color calibration system of claim 1 further wherein the physical target card further comprises an infrared indicator.

11. The color calibration system of claim 10 wherein the software is configured to determine a level of infrared contamination in a scene using the infrared indicator.

12. The color calibration system of claim 1 wherein the physical target card comprises a fugitive indicator configured to change color when exposed to a condition chosen from the list of UV light, chemicals, and temperature extremes.

13. The color calibration system of claim 12 wherein the software is configured to detect the condition of the fugitive indicator and calculate the state of degradation present in the colored patches.

14. The color calibration system of claim 1 wherein the physical target card comprises a protective matte clear coat.

15. The color calibration system of claim 1 wherein the physical target card comprises split pigment patches configured to provide a visual indication of current lighting conditions visible to the naked eye.

16. The color calibration system of claim 1 wherein the physical target card comprises a rigid black material with paint adhesion properties.

17. The color calibration system of claim 1 wherein the physical target card comprises fine alignment markings.

18. The color calibration system of claim 17 wherein the software is configured to detect geometric distortions using the fine alignment markings.

19. The color calibration system of claim 1 wherein the software is configured to encrypt color values from the database.

20. The color calibration system of claim 1 wherein the colored patches comprise pigment spectral curves weighed by color for increasing color profile accuracy.

* * * * *